April 21, 1942.     F. P. BASSETT     2,280,368
AIRCRAFT COCKPIT ENCLOSURE
Filed Dec. 29, 1939
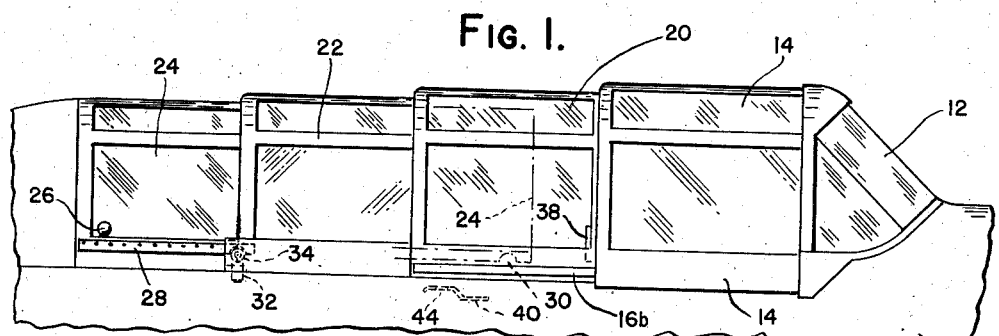
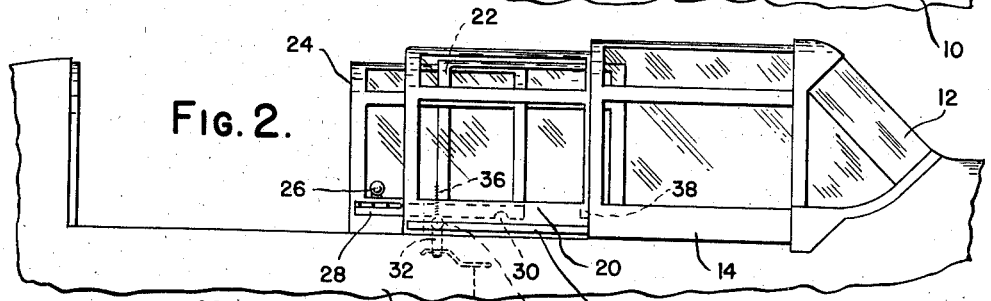
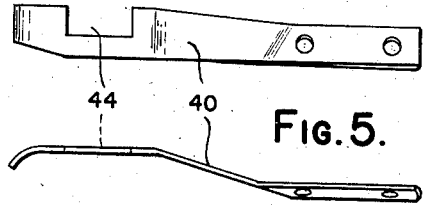
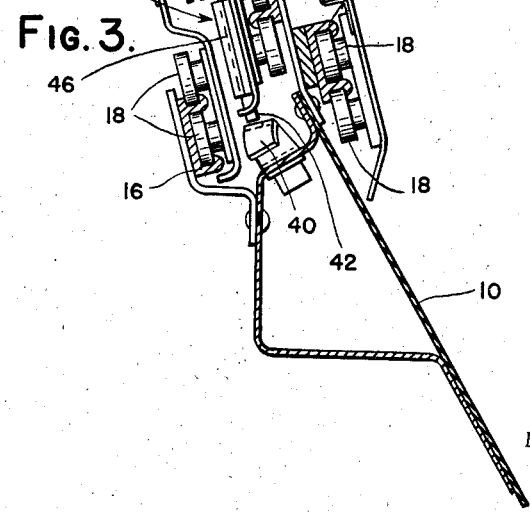
INVENTOR.
FRANCIS P. BASSETT
BY
ATTORNEY.

Patented Apr. 21, 1942

2,280,368

UNITED STATES PATENT OFFICE 2,280,368

AIRCRAFT COCKPIT ENCLOSURE

Francis P. Bassett, Kenmore, N. Y., assignor to Curtiss-Wright Corporation, a corporation of Delaware Application December 29, 1939, Serial No. 311,478

11 Claims. (Cl. 244—121)

This invention relates to control mechanism for the operation of multisection sliding closure or cover members and more particularly aircraft cockpit enclosures.

A principal object of this invention is to simplify the operation of a series of two or more telescoping closure members, such as the sections of an aircraft cabin enclosure, by providing automatic mechanism whereby the whole series of telescoping members may be controlled and locked in all positions by a single, manually operated lock. This eliminates the necessity for separately operable locks for each sliding section.

Another object is to provide such a control mechanism of simplified construction which may be applied to a standard telescoping aircraft cockpit enclosure without complicating the operation of the sliding parts and which will not require useful space for its accommodation.

A further object is to provide a simple, sturdy mechanism of the type described which will perform its allotted function automatically and which will prove reliable under all operating conditions.

Still further objects will become apparent during the course of reading the appended specification and claims when taken in conjunction with an examination of the accompanying drawing, in which:

Fig. 1 is a partial side elevation of an aircraft fuselage provided with a transparent multisection cockpit enclosure in its completely closed condition;

Fig. 2 is a view similar to Fig. 1 showing the rear sliding sections of the enclosure in open position;

Fig. 3 is a partial cross section of the track system;

Fig. 4 is a plan view of a flexible lock strip; and

Fig. 5 is a side elevation of the member shown in Fig. 4.

Referring to the drawing and especially to Figs. 1 and 2 there is shown a portion of an aircraft fuselage generally designated by the numeral 10. This portion includes a forwardly located pilot station and in tandem therewith a rearwardly located station for a gunner, observer or other occupant. To protect the forward crew station from the direct blast of the relative airstream, a fixed transparent windshield 12 is provided which acts to direct the stream upwardly and outwardly. In accordance with modern development, it is now the practice to provide additional protection from the elements, especially to allow heating of the cockpit, by totally enclosing it with a transparent canopy. To provide a means of access to the forward or pilot cockpit station, a section 14 of the transparent enclosure is mounted on trackways 16 and rollers 18 as shown in Fig. 3 so that the section 14 may be slid aft over an intermediate fixed section 20 to uncover the pilot cockpit. This section 20 is preferably formed with transparent panels to increase the field of vision and since it is entirely open interiorly from front to rear, communication between the fore and aft crew stations is facilitated.

The rear crew station is likewise provided with means for ingress and egress by having its closure section slidable on trackways 16 through the intermediacy of a set of rollers 18 carried by the slidable section. However, since the rear crew station usually is provided with an internally mounted machine gun, and in addition may have aerial photographic operations conducted therefrom, it is essential that these operations be unrestricted by any interference with the cockpit enclosure and, hence, a relatively long opening must be provided for use when necessary. In order that there be no interference with the front slidable section 14, which, it will be remembered, slides rearwardly over the intermediate section 20, the rear sliding section is dimensioned transversely such that when it is moved forwardly it will slide under and within the section 20. Furthermore, in order to prevent this relatively long rear section from extending forwardly far enough to restrict free access to the forward crew station, it is made in two or more parts which can telescope together and thus occupy a lesser amount of space as measured longitudinally of the fuselage.

In the embodiment shown, the rear sliding section is formed of two telescoping sections 22 and 24 respectively, although three or more can be used if necessary and the device of this invention applied between each pair of adjacent sections.

When a plurality of sliding sections are employed it materially facilitates their operation if only one manually operated lock means can be utilized to control relative positioning of the closure sections between the full open and full closed positions. As before stated, it is a purpose of this invention to provide means interlinking the separate sections 22 and 24 for operation as a unit and this is in part accomplished by having a single, manually operated lock fixed to one of the sliding closure sections, as for instance the section 24. The handle of such a lock is designated 26 in Figs. 1 and 2 and no more of the lock than this is shown because it can be of conventional construction of any suitable type now well known in the art. Such a lock cooperates with stationary means fixedly mounted on the fuselage interior so that the section 10 can be located in any of its slidable positions, or as many thereof as seems desirable to be provided for.

The remaining portion of the operating mechanism is preferably embodied in the arrangement as follows: A track 28 is fixedly mounted on the closure section 24 along its fore and aft length and near the forward end this track is provided with an indentation 30. Arranged on the closure 22 near its rear end is a vertically reciprocable detent 32 terminally fitted at its upper end with a grooved pulley wheel 34 normally held in engagement with the indentation 30 of track 28 by the action of a coil spring 36. When the wheel is in the indentation, the sections 22 and 24 are releasably held together so that they will slide as a unit along their separate trackways 16 and if found desirable a second identical assembly consisting of a detent 32 and a track 28 may be placed on the opposite side of the fuselage to give a balanced holding action. The trackway 16a for the closure 22 is mounted upon the inner face of the fixed section 20 and the trackway 16b for the forward section 14 is mounted upon the outside of the section 20, as shown in Fig. 3.

The operation of this assembly is such as to cause closure sections 22 and 24 to slide as one as long as the detent wheel 34 remains in the notch 30. However, if the two closures as a unit were moved to the extreme forward position such as would be determined by the stop 38, then the momentum of the unit, or if necessary, additional force tending to move the rear closure 24 still further forwardly, will serve to overcome the tension of spring 36 and allow the detent wheel 34 to be forced downward out of the indentation 30 with the result that the straight portion of track 28 would then be free to roll forward over the wheel. Such operation necessarily is accompanied by telescoping of closure section 24 into section 22 until the former comes to rest against the stop 38. The dash-dot lines in Fig. 1 show an intermediate position of the front portion of section 22.

In order to hold closure section 22 immovable, once the detent 32 has been released, a holding member 40 of spring steel is provided in the form shown as Figs. 4 and 5. This member is fixed to the fuselage in the relative position shown in Fig. 1 and when the detent 32 releases, its lower end 42 is forced downwardly to enter notch 44; since the whole detent slides vertically in a sleeve member 46. Thus the section 22 is rendered immovable during the telescoping of section 24 thereinto, and it remains immovable until section 24 has been completely withdrawn again at which time the detent wheel 34 can again enter indentation 30 under action of spring 36. Obviously with this arrangement the sliding closure sections 22 and 24 may at any time be locked into any sliding position merely by operation of lock handle 26 and the relative locking or unlocking between the closure sections takes place automatically at the proper times. And finally, the purpose in making the catch 40 of spring steel and with a down-curved nose portion, is to prevent any jamming of the closures should the roller 34 jump out of its notch 30 before section 22 is fully telescoped into section 20.

While I have described my invention in detail in its present preferred embodiment and with special reference to its application to an aircraft cockpit enclosure, it will be understood by those skilled in the art, after understanding my invention, that various changes and modifications as well as other embodiments may be made without departing from the spirit or scope thereof. I aim in the appended claims to cover all such modifications and changes.

I claim as my invention:

1. In aircraft construction, in a series of telescoping members, the combination of lock means for one of said members adapted to lock the same to the aircraft, mechanism associated with each successive pair of members comprising auxiliary lock means holding each said member relatively fixed with respect to those next adjacent, and means initiating automatic release of said auxiliary lock means when one member of a pair reaches a predetermined point in its travel, the said auxiliary means locking the last said member to the aircraft as a result of said release.

2. In aircraft construction, in a series of telescoping cockpit enclosure members, manual means for locking one of said members to the aircraft, mechanism associated with each successive pair of members including auxiliary lock means holding each said member relatively fixed with respect to that next adjacent, said auxiliary means automatically releasing when one member of a pair reaches a predetermined point in its travel, and a latch member carried by the aircraft engageable by the last said means as a result of said release adapted to lock the said last mentioned member against further movement with respect to the aircraft.

3. In aircraft construction, in a series of telescoping members, the combination with mechanism associated with each successive pair of members comprising a releasable detent holding each said member relatively fixed to the one next in the series, said detent automatically releasing when one member of a pair reaches a predetermined point in its travel, and means carried by the aircraft adapted to receive said released detent to prevent further movement of said last mentioned member with respect to the aircraft until the other member of said pair is returned to the relative position where said detent became released and spring means tending to restore said detent to its initial position.

4. In aircraft construction, in a series of telescoping members, the combination of mechanism associated with each successive pair of members comprising a releasable detent holding each said member relatively fixed to the one next in the series, stop means to halt the motion of one of said telescoping members adapted to release said detent, a recessed latch carried by said aircraft adapted to hold a portion of said released detent to prevent further movement of said last mentioned telescoping member and spring means tending to restore said detent to its initial position.

5. In aircraft construction, the combination with a pair of telescoping members, of detent means carried by one of said members for interaction with the other of said members to prevent relative movement therebetween, fixed stop means carried by the aircraft engageable by one of said members, the said detent means being automatically releasable upon engagement of said member with said stop means, a fixed receptacle adapted to receive in locking relationship a portion of said detent whereby said last mentioned member is fixed against further movement relative to the aircraft, and means tending to move said detent from engagement in said receptacle to restore said interacting relationship of said members.

6. In aircraft construction, a series of telescoping members consisting of a fixed member and two or more sliding members, a detent carried by one of said sliding members adapted to cooperate with another of said sliding members whereby said members are normally constrained to move as a unit, stop means acting on one of said sliding members when telescoped into said fixed member, resilient means urging said detent into operative position, the said detent being releasable by reactive force created between said stop and any force applied to move said second sliding member toward said stop and latching means carried by the aircraft adapted to hold said detent and lock said telescoped member to the aircraft upon release of said detent from the other said member.

7. In aircraft construction a series of sliding closure sections organized to telescope one within the other, lock means adapted to initially prevent telescoping of two adjacent sections comprising a reciprocally mounted detent attached to one of said adjacent sections, a cam surface having an indentation therein disposed on the other of said adjacent sections, spring means urging said detent into engagement with said cam surface, a stop member disposed to intercept one of said sliding sections to halt the sliding movement thereof whereby said detent may be forced out of said indentation to permit telescoping of said sliding closure sections and latching means carried by the aircraft adapted to hold said detent and lock said telescoped member to the aircraft upon release of the detent from the other said member.

8. In aircraft construction, a series of sliding closure sections organized to telescope one within the other, lock means adapted to initially prevent telescoping of two adjacent sections comprising a reciprocally mounted detent attached to one of said adjacent sections, a cam surface formed with an indentation mounted on the other of said adjacent sections, means urging said detent into engagement with said cam surface, a stop member disposed to halt the sliding movement of one of said adjacent sections whereby said detent may be forced out of said indentation to permit telescoping of said adjacent sections and a stationary receptacle adapted to receive a portion of said detent whereby the closure section to which it is attached is releasably held against sliding movement with respect to the aircraft.

9. In aircraft construction, a series of sliding closure sections organized to telescope one within the other, lock means adapted to initially prevent telescoping of two adjacent sections comprising a reciprocally mounted detent attached to one of said adjacent sections, a member formed on the other of said adjacent sections to normally receive a portion of said detent, means urging said detent into normal position locking said sections for concurrent movement, stationary means disposed to receive in latched relationship a portion of said detent when displaced from normal position, and a stop member disposed on the aircraft so as to arrest the sliding movement of the first of said adjacent sections in one direction whereby pressure applied to tend to slide said other adjacent section in the same direction forces said detent out of normal position to unlock said sections to permit relative telescoping therebetween.

10. In an aircraft cockpit enclosure, two telescoping canopy sections movable with respect to the cockpit and to each other, a manual lock for fixing one of said sections to the aircraft, automatic locking means carried by the other section adapted to releasably latch the same to the first said section in all but its extreme position and a notched resilient member fixed to the aircraft adapted to automatically receive the said means in locked relationship at the instant of the second said section reaching its extreme position at which its latched relationship with the first said section is simultaneously released.

11. In an aircraft cockpit enclosure having a plurality of telescoping sections, an automatically releasable latching mechanism comprising a guide having an indentation carried upon one of said sections, a spring loaded member carried by an adjacent cockpit section and adapted for relative movement with respect thereto, said member carrying roller means adapted to engage said guide and indentation under the influence of said spring, a resilient latch element having a recessed portion engageable by a tongue portion of said member when disengaged from said guide indentation, whereby the first and adjacent cockpit sections may be moved as a unit until said adjacent section reaches the limit of its movement, whereupon its automatic locking to the aircraft and its disengagement from the first said section is automatically effected.

FRANCIS P. BASSETT.